United States Patent
Taniguchi et al.

(10) Patent No.: US 11,214,248 B2
(45) Date of Patent: Jan. 4, 2022

(54) IN-VEHICLE MONITORING CAMERA DEVICE

(71) Applicant: Mitsubishi Electric Corporation, Tokyo (JP)

(72) Inventors: Takuya Taniguchi, Tokyo (JP); Noritaka Kokido, Tokyo (JP); Nariaki Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 238 days.

(21) Appl. No.: 16/603,962

(22) PCT Filed: May 11, 2017

(86) PCT No.: PCT/JP2017/017826
§ 371 (c)(1),
(2) Date: Oct. 9, 2019

(87) PCT Pub. No.: WO2018/207303
PCT Pub. Date: Nov. 15, 2018

(65) Prior Publication Data
US 2020/0148203 A1     May 14, 2020

(51) Int. Cl.
*B60W 30/095* (2012.01)
*G08G 1/16* (2006.01)
(Continued)

(52) U.S. Cl.
CPC ...... *B60W 30/0956* (2013.01); *B60W 30/095* (2013.01); *G08G 1/166* (2013.01);
(Continued)

(58) Field of Classification Search
CPC ...... B60Q 1/00; B60Q 1/0017; B60Q 1/0023; B60Q 1/04; B60R 1/00; B60R 2300/30;
(Continued)

(56) References Cited

U.S. PATENT DOCUMENTS 8,189,031 B2 * 5/2012 Kim ................. G06T 3/4038
348/36
8,633,810 B2 * 1/2014 Luo ................. B60R 11/04
340/436
(Continued)

FOREIGN PATENT DOCUMENTS

JP   2006-178667 A   7/2006
JP   2008-230476 A   10/2008
(Continued)

OTHER PUBLICATIONS

NPL_search (Aug. 17, 2021).*
Office Action dated Apr. 28, 2020 in Japanese Application No. 2019-516811.
International Search Report for PCT/JP2017/017826 dated Aug. 15, 2017 [PCT/ISA/210].

*Primary Examiner* — Van T Trieu
(74) *Attorney, Agent, or Firm* — Sughrue Mion, PLLC; Richard C. Turner (57) ABSTRACT

An in-vehicle monitoring camera device 100 includes: an obstacle detection unit 3 that detects, as first obstacles, obstacles detected by a millimeter-wave radar 11 which might collide with the host vehicle; a collision risk determination unit 4 that detects the time before the respective first obstacles and the vehicle come into contact with each other; a distortion correction unit 2 that generates image 2 by correcting distortion in image 1 captured using a wide-angle lens; and a camera-viewpoint display control unit 5 that generates image 3 by cutting out, from image 2, an image of the first obstacle having the shortest time to collision. Therein, a radar chart 31 indicating the visual field range or the center direction of the visual field of image 3 is superimposed on image 3.

10 Claims, 9 Drawing Sheets

(51) Int. Cl.
*B60R 11/04* (2006.01)
*B60W 50/14* (2020.01)
*G06K 9/00* (2006.01)

(52) U.S. Cl.
CPC ......... *B60R 11/04* (2013.01); *B60R 2300/301* (2013.01); *B60R 2300/307* (2013.01); *B60R 2300/8093* (2013.01); *B60W 50/14* (2013.01); *B60W 2050/146* (2013.01); *G06K 9/00805* (2013.01)

(58) Field of Classification Search
CPC ........ B60R 2300/301; B60R 2300/307; B60R 2300/605; B60R 2300/70; B60W 30/095; B60W 30/0956; G08G 1/16; G08G 1/166
See application file for complete search history.

(56) References Cited

U.S. PATENT DOCUMENTS

| | | | |
|---|---|---|---|
| 10,685,449 B2 * | 6/2020 | Takemura | G06K 9/00805 |
| 2008/0231702 A1 | 9/2008 | Matsumoto et al. | |
| 2015/0109444 A1 * | 4/2015 | Zhang | H04N 7/188 348/148 |

FOREIGN PATENT DOCUMENTS

| | | |
|---|---|---|
| JP | 2009-023565 A | 2/2009 |
| JP | 2009-067292 A | 4/2009 |
| JP | 2012-227699 A | 11/2012 |
| JP | 2015-22340 A | 2/2015 |
| JP | 2016-75818 A | 5/2016 |

* cited by examiner

| TIME OR DISTANCE TO CONTACT | SHAPE OF MARK | COLOR OF MARK |
|---|---|---|
| TIME: SHORTER THAN 2 SECONDS<br>DISTANCE: SHORTER THAN 3 m |  | RED |
| TIME: 2 SECONDS<=TIME< 5 SECONDS<br>DISTANCE: 3 m<= DISTANCE< 6 m |  | GREEN |
| TIME: EQUAL TO OR<br>  LONGER THAN 5 SECONDS<br>DISTANCE: EQUAL TO OR<br>  LONGER THAN 6 m |  | BLUE |

IN-VEHICLE MONITORING CAMERA DEVICE

CROSS REFERENCE TO RELATED APPLICATIONS

This application is a National Stage of International Application No. PCT/JP2017/017826 filed May 11, 2017.

TECHNICAL FIELD

The present invention relates to an in-vehicle monitoring camera device, and more particularly, to an in-vehicle monitoring camera device configured to monitor surroundings of a vehicle through use of a camera to notify a driver of an obstacle having a risk of colliding with the vehicle.

BACKGROUND ART

As a widespread in-vehicle monitoring camera, there is a vehicle rearview monitoring camera for enabling a driver to view an obstacle behind a vehicle when the vehicle travels backward.

In some cases, such a monitoring camera is provided with a radar for monitoring an obstacle behind a vehicle or an object approaching the vehicle. The radar is configured to search a wide range of area for an obstacle that is likely to collide with an own vehicle when the own vehicle travels backward. The range of detection of the radar is accordingly wider than a field-of-view range of the monitoring camera, and hence, in some cases, an object detected by the radar cannot be viewed on an image of the monitoring camera because the object is outside the field-of-view range of the monitoring camera.

To address this issue, there may be used a rearview monitoring camera having a field-of-view range greatly increased through use of a wide-angle lens capable of increasing an image pickup range to nearly 180°. However, in this case, there is a drawback in that an image is distorted by the wide-angle lens, and hence the driver has difficulty in grasping a positional relationship with an object.

To overcome this drawback, for example, in a vehicle image correction device described in Patent Literature 1, there is used a technology for removing distortion caused by a wide-angle lens through image processing. In the device described in Patent Literature 1, a specific position to be a reference for image correction processing is set in an image picked up by an image pickup unit, and portions of the image on left and right sides of the specific position are shifted in a vertical direction of the image to linearly correct distortion within the image in a widthwise direction of a vehicle.

CITATION LIST

Patent Literature

[PTL 1] JP 2006-178667 A

SUMMARY OF INVENTION

Technical Problem

However, even when an image having a wide view angle of, for example, 180° is acquired through use of such a technology as described in Patent Literature 1, a large-sized display device is required to display the image without distortion. Thus, there has been a problem in that it is difficult to install such a large-sized display device in a driver's seat in a vehicle, which is limited space.

The present invention has been made in order to solve the above-mentioned problem, and has an object to provide an in-vehicle monitoring camera device capable of enabling a driver to quickly grasp a direction of a detected obstacle without requiring a large-sized display device.

Solution to Problem

According to one embodiment of the present invention, there is provided an in-vehicle monitoring camera device, including: an obstacle detection unit configured to detect, as a first obstacle, an obstacle that is likely to collide with an own vehicle from among obstacles detected by a radar or a camera; a collision risk determination unit configured to detect a time until the first obstacle and the own vehicle come into contact with each other or a distance between the first obstacle and the own vehicle; a distortion correction unit configured to receive input of a first image picked up by a wide-angle lens, which has an image pickup range wider than an image pickup range of a standard lens, and correct distortion of the first image to generate a second image; a camera viewpoint display control unit configured to detect, as a second obstacle, a first obstacle having the shortest time or the shortest distance from among the times or the distances detected by the collision risk determination unit, and cut out an image having a fixed range from the second image such that the second obstacle is located at a center in a lateral direction of the image to generate a third image; and a first display device configured to display the third image, in which the camera viewpoint display control unit is configured to superimpose, onto the third image, an image indicating a field-of-view range of the third image or a central direction of a field of view of the third image.

Advantageous Effects of Invention

The in-vehicle monitoring camera device according to one embodiment of the present invention is configured to cut out the image of the obstacle from the image picked up by the wide-angle lens, and superimposes, onto the cut-out image, the image indicating the field-of-view range of the image or the central direction of the field of view of the image for display. It is therefore possible to enable a driver to quickly grasp the direction of the obstacle without requiring a large-sized display device.

DESCRIPTION OF EMBODIMENTS

Now, an in-vehicle monitoring camera device according to each of embodiments of the present invention is described with reference to the drawings.

First Embodiment

Figure 1:
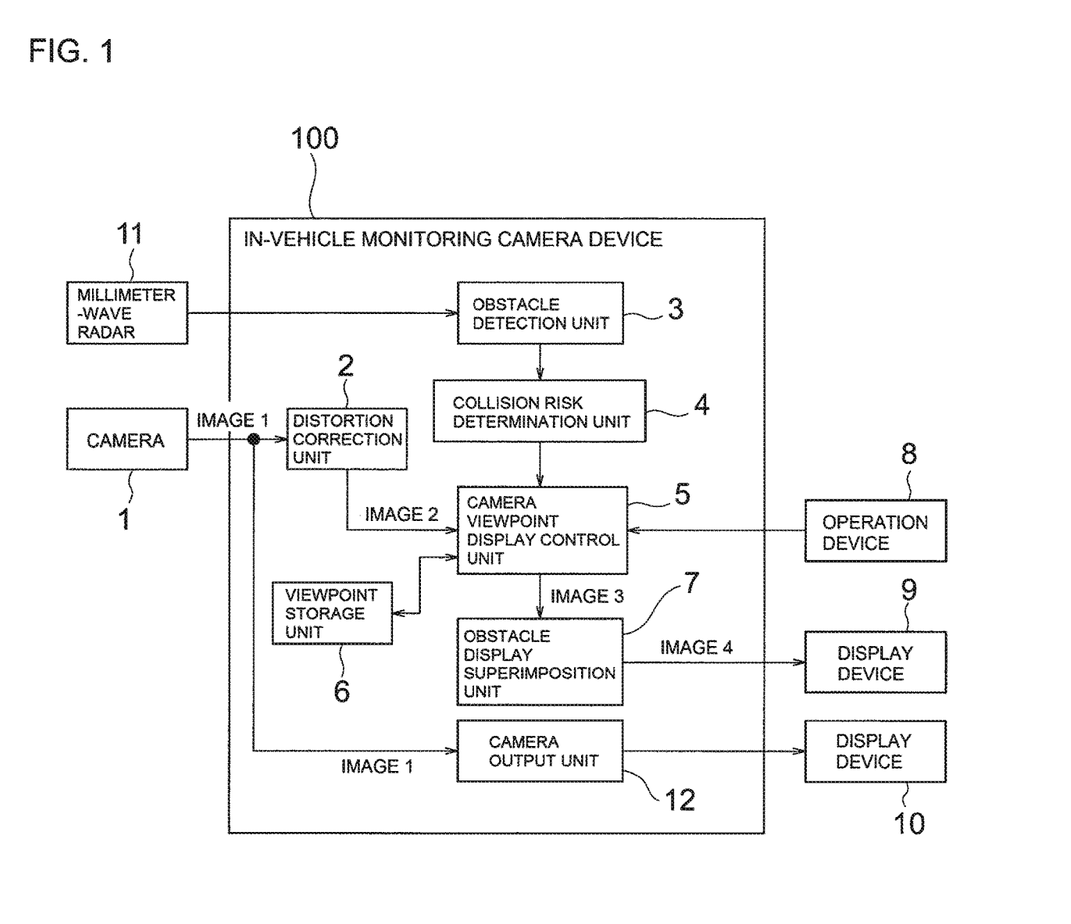
FIG. 1 is a block diagram for illustrating configuration of an in-vehicle monitoring camera device according to a first embodiment of the present invention.

FIG. 1 is a block diagram for illustrating a configuration of an in-vehicle monitoring camera device according to a first embodiment of the present invention. An in-vehicle monitoring camera device 100 is mounted to a vehicle. In the following, the vehicle to which the in-vehicle monitoring camera device 100 is mounted is referred to as "own vehicle", and a vehicle other than the own vehicle is referred to as "another vehicle".

Figure 5:
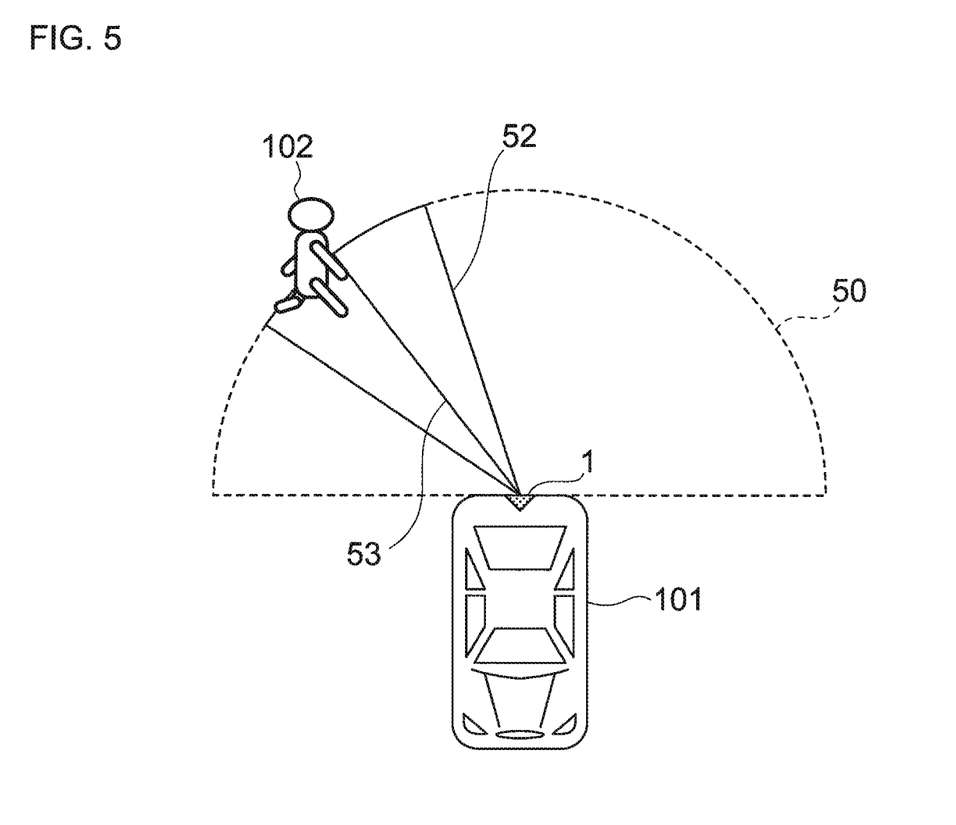
FIG. 5 is a diagram for illustrating an image pickup range of a camera in the in-vehicle monitoring camera device according to the first embodiment of the present invention.

First, as illustrated in FIG. 1, a camera 1 is connected to the in-vehicle monitoring camera device 100. As illustrated in FIG. 5, the camera 1 is arranged in a rear portion of the own vehicle 101. The camera 1 is equipped with a wide-angle lens, which has an image pickup range wider than that of a standard lens. The wide-angle lens is capable of increasing the image pickup range up to 180°. Thus, as in an image pickup range 50 illustrated in FIG. 5, the camera 1 is capable of acquiring an image within an image pickup range having a lens position of the camera 1 as its center and having a wide view angle of, for example, 180°. The camera 1 picks up an image behind the own vehicle 101 to output an image 1.

The in-vehicle monitoring camera device 100 includes a distortion correction unit 2 as means for acquiring an image. The distortion correction unit 2 receives the image 1 from the camera 1, and removes distortion of the image 1 caused by the wide-angle lens to obtain an image 2. As a method of removing distortion of an image caused by the wide-angle lens through image processing, various methods have been proposed as described in, for example, Patent Literature 1. Thus, the distortion correction unit 2 may use, for example, one of such existing technologies to remove distortion of the image 1, and a method of removing distortion of the image 1 is thus not limited to a specific method herein.

As illustrated in FIG. 1, a millimeter-wave radar 11 is further connected to the in-vehicle monitoring camera device 100. The millimeter-wave radar 11 is arranged in, for example, the rear portion of the own vehicle 101. The millimeter-wave radar 11 emits a radio wave in a millimeter-wave band, and receives a reflected wave, which is the radio wave reflected by a surface of an obstacle. The millimeter-wave radar 11 uses the reflected wave to output coordinates of a reflection point as sensing information on the obstacle.

The in-vehicle monitoring camera device 100 includes an obstacle detection unit 3 and a collision risk determination unit 4 as means for acquiring information on an obstacle.

The obstacle detection unit 3 receives the sensing information from the millimeter-wave radar 11 at cycles set in advance, and identifies a set of coordinates of the reflection points as an obstacle based on the coordinates of the reflection points contained in the sensing information, and detects a position, direction, and speed of the obstacle based on movement with time of the set of coordinates. The obstacle detection unit 3 further detects an obstacle that is likely to collide with the own vehicle 101 based on the position, direction, and speed of the obstacle and on a position, direction, and speed of the own vehicle 101. This obstacle is hereinafter referred to as "first obstacle".

The collision risk determination unit 4 detects a time until the own vehicle 101 comes into contact with the first obstacle detected by the obstacle detection unit 3, and detects a distance between the first obstacle and the own vehicle.

Figure 3:
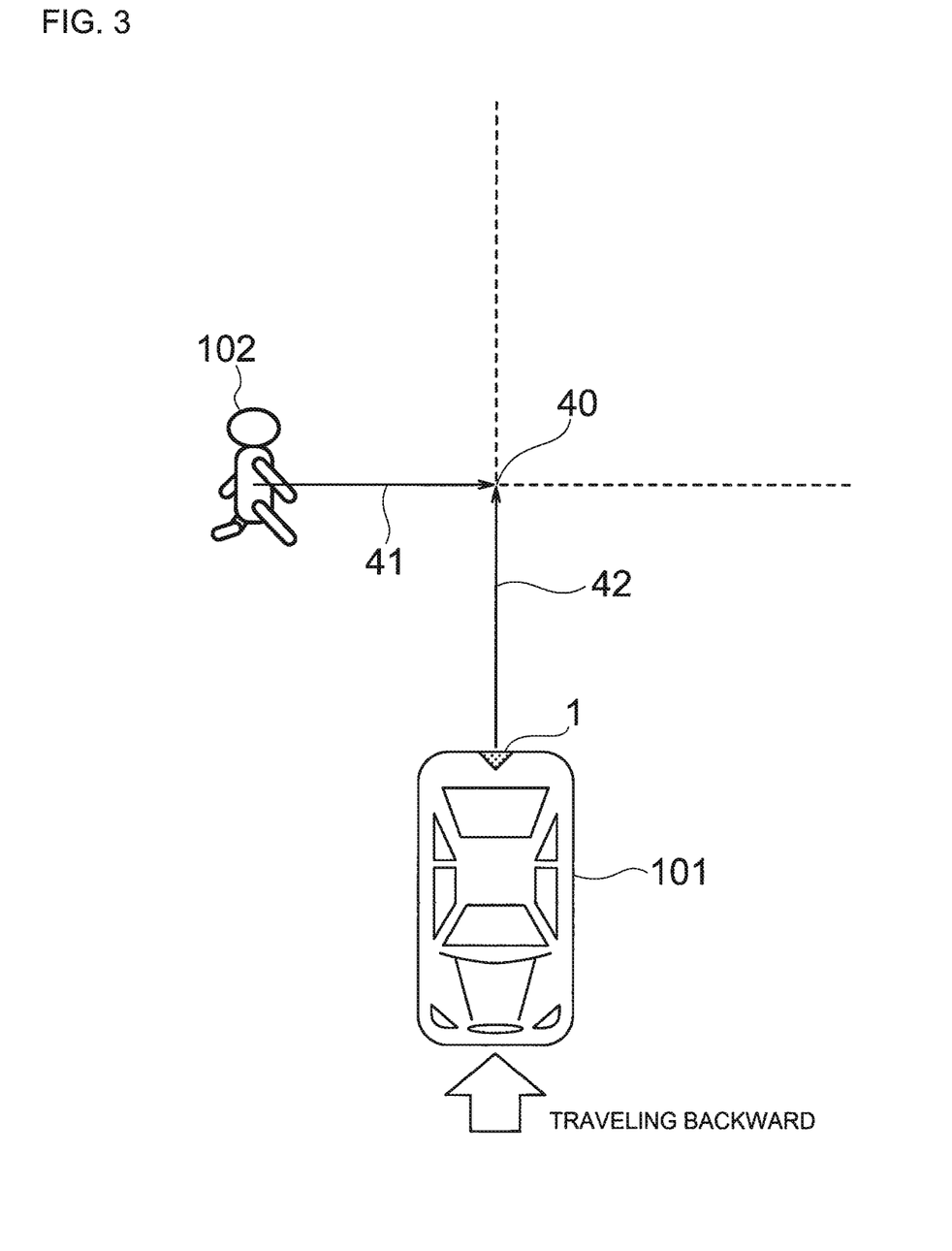
FIG. 3 is a diagram for illustrating a detection method to be performed by a collision risk determination unit in the in-vehicle monitoring camera device according to the first embodiment of the present invention.

Referring to FIG. 3, a description is given of a method of detecting a "time to contact" by the collision risk determination unit 4. The collision risk determination unit 4 derives, based on the position, direction, and speed of a first obstacle 102 and on the position, direction, and speed of the own vehicle 101, an intersection point 40, at which the direction of the own vehicle 101 crosses the direction of the first obstacle 102. Next, the collision risk determination unit 4 derives a time A until the first obstacle 102 arrives at the intersection point 40 (see reference numeral 41), and a time B until the own vehicle 101 arrives at the intersection point 40 (see reference numeral 42). The collision risk determination unit 4 derives a shorter one of the time A to arrival and the time B to arrival as the "time to contact". The collision risk determination unit 4 further derives, based on the position of the first obstacle 102 and the position of the own vehicle 101, a distance between the first obstacle 102 and the own vehicle 101 as "distance between the obstacle and the own vehicle". In the example of FIG. 3, the obstacle 102 is a pedestrian, but the obstacle is not limited to a pedestrian. The obstacle 102 includes a dynamic obstacle, such as an animal, a tricycle, a bicycle, a motorcycle, and another vehicle, and a still obstacle, such as a guardrail or a utility pole.

The in-vehicle monitoring camera device 100 further includes a camera viewpoint display control unit 5 and an obstacle display superimposition unit 7 as means for performing display. A viewpoint storage unit 6 is connected to the camera viewpoint display control unit 5. The viewpoint storage unit 6 is constructed of a memory. The viewpoint storage unit 6 stores information on an obstacle. The information on an obstacle is, for example, an ID of the obstacle.

The camera viewpoint display control unit 5 performs the following three operations (1) to (3).

(1) The camera viewpoint display control unit 5 determines whether or not information on an obstacle is recorded in the viewpoint storage unit 6, and when the information is not recorded, extracts a first obstacle having the shortest time from among the "times to contact" detected by the collision risk determination unit 4, and sets the extracted first obstacle as a second obstacle to store information on the second obstacle into the viewpoint storage unit 6.

(2) The camera viewpoint display control unit 5 reads the information on the second obstacle from the viewpoint storage unit 6, and cuts out an image of the second obstacle from the image 2 to generate an image 3. When the image of the second obstacle is to be cut out, a fixed range that is set in advance is cut out from the image 2 such that the second obstacle is positioned at a center of the image in its lateral direction. The fixed range is, for example, a pixel range that is set in advance. The fixed range is set to a fixed value irrespective of the distance to the second obstacle. Further, at this time, a center of the image in its longitudinal direction is fixed irrespective of the position of the obstacle. As a result, as the distance from the own vehicle 101 to an obstacle becomes larger, a position of the obstacle in the image becomes closer to a horizontal line. With the center of the image in its longitudinal direction being fixed in this manner, a driver can easily grasp the distance to the obstacle.

Figure 4A:
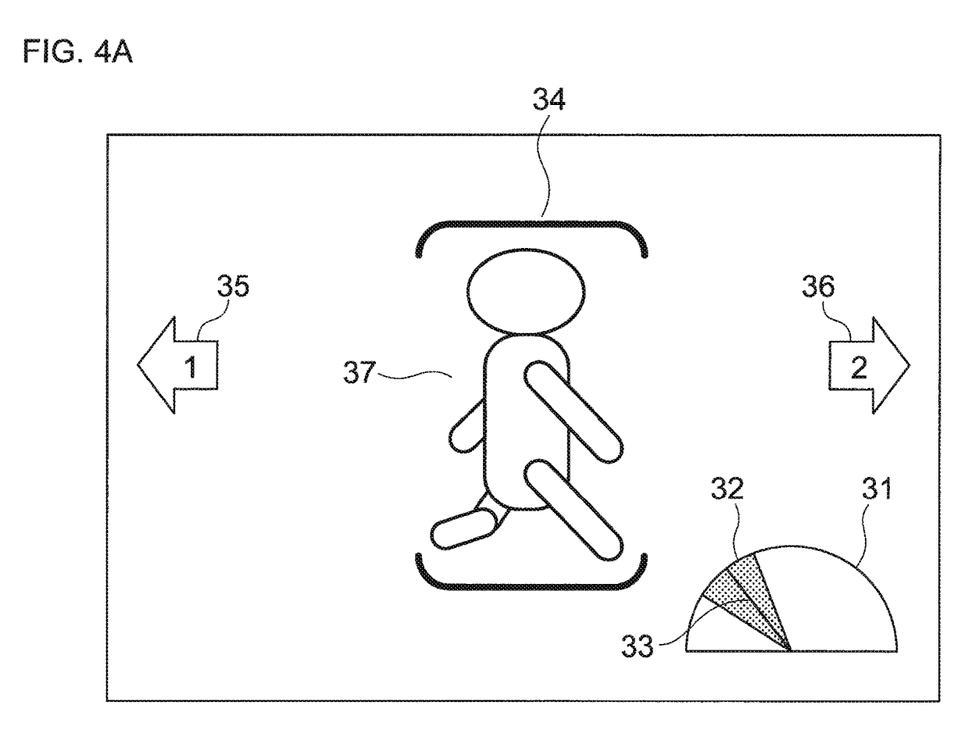
FIG. 4A is a diagram for illustrating an example of a screen to be displayed on a display device in the in-vehicle monitoring camera device according to the first embodiment of the present invention.

(3) In order to enable the driver to grasp a direction of the second obstacle, for example, as illustrated in FIG. 4A, the camera viewpoint display control unit 5 superimposes onto the image 3 a radar chart 31 indicating a field-of-view range of the image 3 and a central direction of a field of view of the image 3. In FIG. 4A, an example of the radar chart 31 is illustrated. As illustrated in FIG. 4A, the radar chart 31 has a semicircular shape having the own vehicle 101 as its center. In the radar chart 31, a field-of-view range 32 of the image 3 and a central direction 33 of the field of view of the image 3 are displayed. In FIG. 4A, the colored area indicates the field-of-view range 32, and the solid line indicates the central direction 33 of the field of view. Although the radar chart 31 indicates both of the field-of-view range 32 of the image 3 and the central direction 33 of the field of view of the image 3 in this case, the radar chart 31 may indicate only one of the field-of-view range 32 and the central direction 33.

The radar chart 31 is described in more detail. FIG. 4A and FIG. 5 are compared with each other. In FIG. 5, reference numeral 50 denotes the image pickup range of the camera 1, and reference numeral 52 denotes a range displayed as the image 3. The range is hereinafter referred to as "display range." or "field-of-view range" of the image 3. In addition, reference numeral 53 denotes the direction of the obstacle 102. The direction of the obstacle 102 indicates the central direction of the field of view of the image 3. At this time, the image pickup range 50 of FIG. 5 corresponds to the semicircle of the radar chart 31 of FIG. 4A. Similarly, the display range 52 of FIG. 5 corresponds to the field-of-view range 32 of FIG. 4A. Further, the direction 53 of FIG. 5 corresponds to the central direction 33 of the field of view of FIG. 4A.

The obstacle display superimposition unit 7 superimposes a mark whose shape and color are changed depending on a time to contact with the second obstacle or a distance to the second obstacle, which is detected by the collision risk determination unit 4, onto the second obstacle displayed on the image 3 to generate an image 4, and outputs the image 4 to a display device 9. As illustrated in FIG. 1, the display device 9 and a display device 10 are connected to the in-vehicle monitoring camera device 100. The mark is highlight display for alerting the driver to the second obstacle displayed on the image 3. The mark has the shape and color changed depending on the time or distance to contact, and hence the shape and color of the mark enable the driver to recognize a priority of the second obstacle, that is, a level of urgency.

Figure 4B:
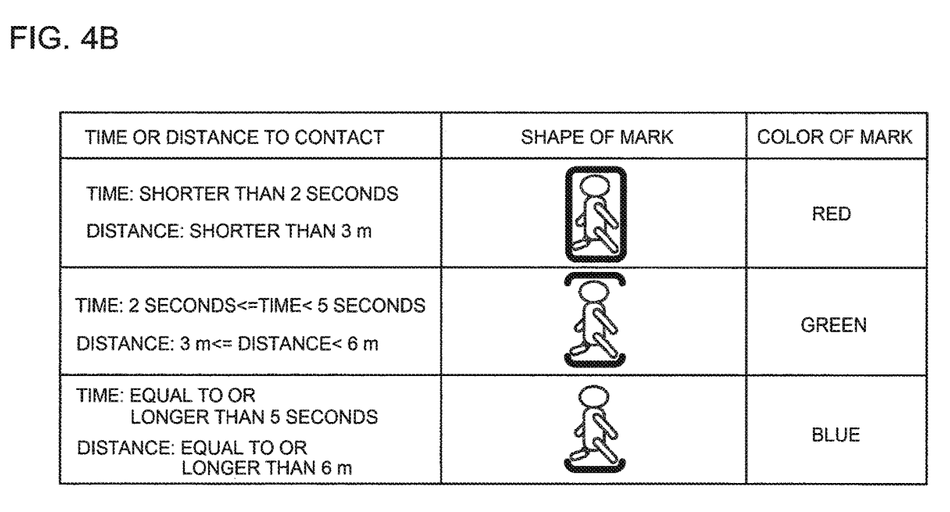
FIG. 4B is a diagram for showing an example of a data table in which a shape and color of a mark to be superimposed by an obstacle display superimposition unit are defined for each time or distance to contact in the in-vehicle monitoring camera device according to the first embodiment of the present invention.

In FIG. 4A, an example of a mark 34 to be superimposed onto the image 4 (reference numeral 30) is illustrated. Further, in FIG. 4B, an example of a data table in which the shape and color of the mark 34 are defined for each time or distance to contact is shown. As shown in FIG. 4B, when the time to contact is equal to or shorter than 2 seconds, or the distance to contact is shorter than 3 m, in order to indicate that the priority is at a high level, the shape of the mark is set to a rectangular shape, and the color of the mark is set to red. When the time to contact is equal to or longer than 2 seconds and shorter than 5 seconds, or the distance to contact is equal to or longer than 3 m and shorter than 6 m, in order to indicate that the priority is at an intermediate level, the shape of the mark is set to parentheses, and the color of the mark is set to green. Meanwhile, when the time to contact is equal to or longer than 5 seconds, or the distance to contact is equal to or longer than 6 m, in order to indicate that the priority is at a low level, only a lower one of the parentheses is displayed as the shape of the mark, and the color of the mark is set to blue. Through displaying of the mark 34 and the radar chart 31 on the image 4 in this manner, it is possible to present to the driver the direction of the obstacle and the priority thereof at the same time. The above-mentioned shape and color of the mark are merely an example, and the shape and color of the mark are not limited to those given above.

The in-vehicle monitoring camera device 100 further includes a camera output unit 12. The camera output unit 12 outputs the image 1 acquired from the camera 1 to the display device 10 as it is, in order to display the entire image 1 acquired from the camera 1. The driver views the image 4 on the display device 9 and the image 1 on the display device 10 at the same time, to thereby be able to accurately grasp a positional relationship with an obstacle through the image 4 while roughly grasping a state of an entire area behind the own vehicle 101 at a wide view angle of 180° through the image 1.

The camera viewpoint display control unit 5 further performs the following operation (4) in addition to the above-mentioned operations (1) to (3). As illustrated in FIG. 1, an operation device 8 can be connected to the camera viewpoint display control unit 5.

(4) The camera viewpoint display control unit includes a system for receiving a signal from the operation device 8 and changing obstacle IDs stored in the viewpoint storage unit 6 in any one of order of a time until the own vehicle 101 comes into contact with an obstacle, order of a distance to the obstacle, or order of a direction of a viewpoint toward the obstacle. This enables the driver to specify which of the orders is to be used to select the next obstacle when an obstacle currently displayed on the display device 9 is to be switched to the next obstacle. Details thereof are described later.

Figure 2A:
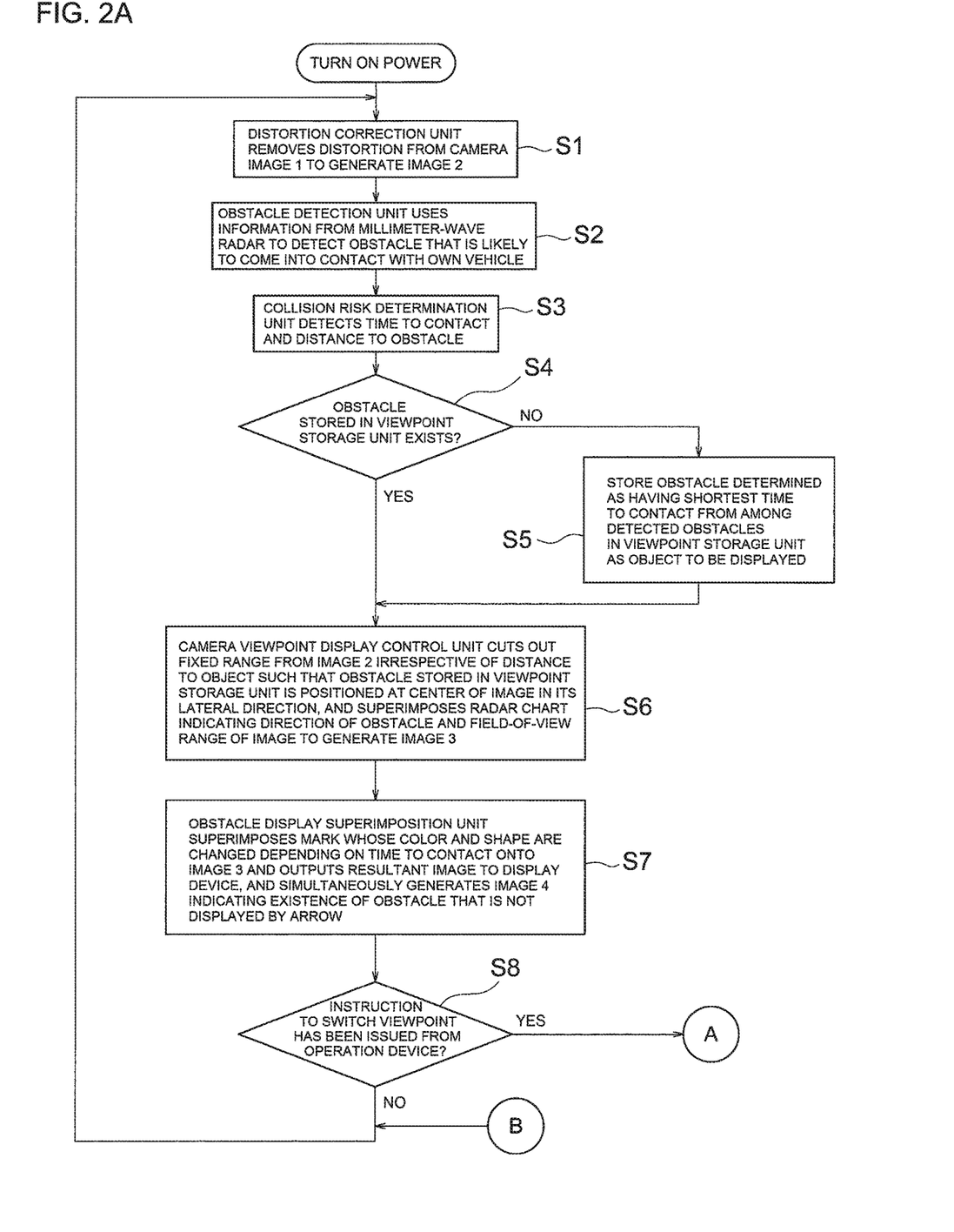
FIG. 2A is a flow chart for illustrating a flow of processing to be performed by the in-vehicle monitoring camera device according to the first embodiment of the present invention.
Figure 2B:
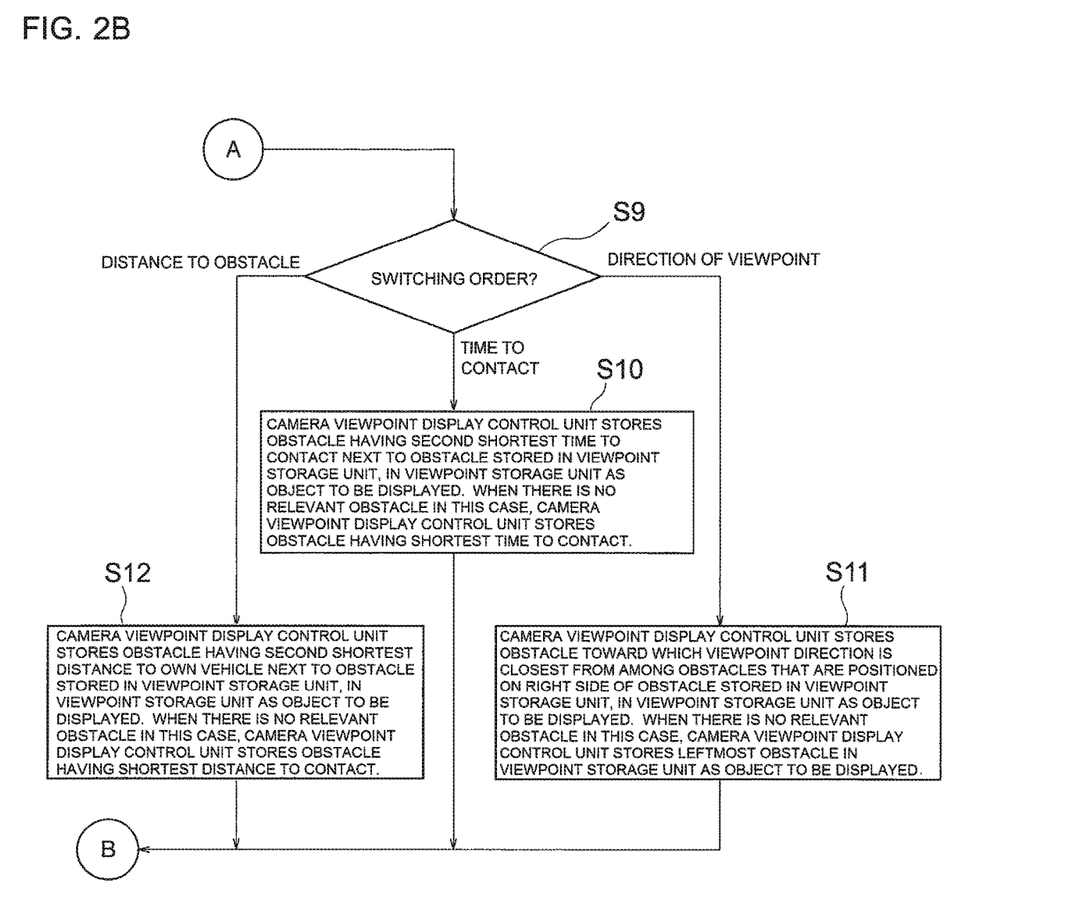
FIG. 2B is a flow chart for illustrating a flow of processing to be performed by the in-vehicle monitoring camera device according to the first embodiment of the present invention.

Next, referring to flow charts of FIG. 2A and FIG. 2B, a description is given of an operation of the in-vehicle monitoring camera device 100 according to the first embodiment.

As illustrated in FIG. 2A, first, the distortion correction unit 2 removes, from the image 1 acquired from the camera 1, distortion caused by the wide-angle lens to generate the image 2 (Step S1).

Next, the obstacle detection unit 3 identifies one or more obstacles based on a set of coordinates from the millimeter-wave radar 11 and movement with time of the set of coordinates, detects the position, direction, and speed of each of the obstacles, and extracts, based on the position, direction, and speed of the obstacle and on the position, direction, and speed of the own vehicle, an obstacle that is likely to come into contact with the own vehicle from among the obstacles as a first obstacle (Step S2).

Next, the collision risk determination unit 4 uses the method illustrated in FIG. 3 to detect a time until the own vehicle comes into contact with the first obstacle, and detects a distance between the first obstacle and the own vehicle (Step S3). At this time, a new ID is assigned to a newly detected obstacle, and the same ID as a previous ID is assigned to a previously detected obstacle.

Next, in order to select an obstacle to be displayed on the display device 9, the camera viewpoint display control unit 5 reads an ID of an obstacle stored in the viewpoint storage unit 6, and determines whether or not the obstacle exists in the image 2 (Step S4).

When the obstacle does not exist, the camera viewpoint display control unit 5 determines that the obstacle has disappeared, and stores in the viewpoint storage unit 6 an ID of an obstacle having the shortest time to contact from among the detected first obstacles (Step S5). Meanwhile, when the obstacle exists, the processing directly proceeds to Step S6.

Next, the camera viewpoint display control unit 5 reads the ID of the obstacle stored in the viewpoint storage unit 6, and cuts out a pixel range that is set in advance from the image 2 such that the relevant obstacle is positioned at a center of the image in its lateral direction to generate the image 3. At this time, the center of the image in its longitudinal direction is fixed irrespective of the position of the obstacle in order to enable the driver to grasp the distance to an obstacle, to thereby enable the driver to see how the obstacle becomes closer to the horizontal line as the distance to the obstacle becomes larger. Further, the obstacle display superimposition unit 7 superimposes, onto the image 3, the semicircular radar chart 31 having the own vehicle 101 as its center (Step S6).

After that, as illustrated in FIG. 4A, the obstacle display superimposition unit 7 superimposes, onto the image 3, the mark 34 defined in the table of FIG. 4B such that the shape and color are changed depending on a time to collision. As a method of superimposing the mark 34, the obstacle display superimposition unit 7 superimposes the mark 34 onto a pixel range 37 within the image 3, which corresponds to the obstacle 102. Further, as illustrated in FIG. 4A, the obstacle display superimposition unit 7 indicates, on the image 3, left obstacle information and right obstacle information each indicating existence of another obstacle that is not displayed in the image 3 by an arrow 35 and an arrow 36, respectively. The obstacle display superimposition unit 7 also displays in each of the arrows 35 and 36 a number indicating the number of obstacles. As a result, the image 4 illustrated in FIG. 4A is generated (Step S7).

As illustrated in FIG. 1, the operation device 8 can be connected to the in-vehicle monitoring camera device 100. An operation to be performed in response to a driver's operation on the operation device 8 when the operation device 8 is connected to the in-vehicle monitoring camera device 100 is described as Step S8 and subsequent steps.

When an operation input to switch a viewpoint has been performed by the driver, the operation device 8 transmits to the camera viewpoint display control unit 5 a signal indicating that the operation input has been performed. Accordingly, the camera viewpoint display control unit 5 confirms whether or not the operation input to switch a viewpoint has been performed based on whether or not the signal has been input from the operation device (Step S8). When the operation input has been performed, the processing proceeds to Step S9 of FIG. 2B. Meanwhile, when no operation input has been performed, the processing returns to the processing of Step S1.

When the operation input has been performed, the camera viewpoint display control unit 5 determines a specific switching order that has been input to the operation device 8 (Step S9). The switching order is, for example, one of the following three types of orders: "order of time to contact", "order of direction of viewpoint", and "order of distance to obstacle".

When the switching order is determined to be the "order of time to contact" in Step S9, the camera viewpoint display control unit 5 stores an ID of an obstacle having the second shortest time to contact next to the obstacle stored in the viewpoint storage unit 6 from among the obstacles detected in Step S2, in the viewpoint storage unit 6 as an object to be displayed. When there is no relevant obstacle in this case, the camera viewpoint display control unit 5 stores an ID of an obstacle having the shortest time to contact in the viewpoint storage unit 6 as an object to be displayed (Step S10).

When the switching order is determined to be the "order of direction of viewpoint" in Step S9, the camera viewpoint display control unit 5 stores an ID of an obstacle toward which the viewpoint direction is closest from among obstacles that are detected in Step S2 and are positioned on the right side of the obstacle stored in the viewpoint storage unit 6, in the viewpoint storage unit 6 as an object to be displayed. When there is no relevant obstacle on the right side of the obstacle in this case, the camera viewpoint display control unit 5 stores an ID of an obstacle toward which the viewpoint direction is leftmost in the viewpoint storage unit 6 (Step S11).

When the switching order is determined to be the "order of distance to obstacle" in Step S9, the camera viewpoint display control unit 5 stores an ID of an obstacle having the second shortest distance to the own vehicle 101 next to the obstacle stored in the viewpoint storage unit 6 from among the obstacles detected in Step S2, in the viewpoint storage unit 6 as an object to be displayed. When there is no relevant obstacle in this case, the camera viewpoint display control unit 5 stores an ID of an obstacle having the shortest distance to the own vehicle 101 in the viewpoint storage unit 6 as an object to be displayed (Step S12).

The processing of from Step S1 to Step S12 is periodic loop processing, and after the processing of Step S12 is finished, the processing waits for the image 1 to be input from the camera 1, and then the processing of from Step S1 to Step S12 is started again.

Although an illustration of an operation of the camera output unit 12 is omitted in FIG. 2A and FIG. 2B, the camera output unit 12 always outputs the image 1 output from the camera 1 to the display device 10 so as to enable the driver to view the entire image picked up by the camera 1.

Through implementation with such a system configuration and operation, when the own vehicle 101 travels back, even without use of a large-sized display device, the driver can quickly grasp existence and a position of an obstacle having a risk of colliding with the own vehicle 101 in a wide range of 180° around the vehicle.

As described above, according to the first embodiment, the in-vehicle monitoring camera device 100 includes: the obstacle detection unit 3 configured to detect, as a first obstacle, an obstacle that is likely to collide with the own vehicle 101 from among obstacles detected by the millimeter-wave radar 11; the collision risk determination unit 4 configured to detect a time until the first obstacle and the own vehicle 101 come into contact with each other or a distance between the first obstacle and the own vehicle; the distortion correction unit 2 configured to receive input of a first image picked up by a wide-angle lens, and correct distortion of the first image to generate a second image; the camera viewpoint display control unit 5 configured to extract, as a second obstacle, a first obstacle having the shortest time or the shortest distance from among the times or the distances detected by the collision risk determination unit 4, and cut out an image having a fixed range from the second image such that the second obstacle is located at a center in a lateral direction of the image to generate a third image; and the first display device 9 configured to display the third image. Further, the camera viewpoint display control unit 5 is configured to superimpose, onto the third image, the radar chart 31, which is an image indicating a field-of-view range of the third image or a central direction of a field of view of the third image, to thereby indicate a direction of the second obstacle. With this configuration, without requiring a display device having a larger size than that of a display device having a standard size, it is possible to enable the driver to quickly grasp the distance to the detected obstacle and the direction thereof. The radar chart 31 is merely one example, and any image can be used as long as the image indicates the field-of-view range of the third image or the central direction of the field of view of the third image. For example, the shape of the image may be, instead of the semicircular shape illustrated in FIG. 4A, a circular shape or a rectangular shape. Further, a display mode and display method for displaying the field-of-view range 32 of the image and the central direction 33 of the field of view of the image may be another display mode and display method involving, for example, indicating the central direction 33 of the field of view by an arrow.

In the first embodiment, the in-vehicle monitoring camera device 100 further includes the obstacle display superimposition unit 7 configured to superimpose the mark 34, which is highlight display for highlighting the second obstacle displayed in the third image, onto the second obstacle in the third image. This enables the driver to instantaneously grasp a level of a risk of collision with the obstacle.

In the first embodiment, the operation device 8 configured to receive input of a switching instruction to switch the second obstacle to be displayed in the third image to another second obstacle from among the first obstacles may be used. In this case, the second obstacle to be displayed in the third image can be switched to another second obstacle in accordance with a driver's switching instruction.

In the first embodiment, the obstacle display superimposition unit 7 may be configured to indicate pieces of information indicating existence of other first obstacles that are not displayed in the third image by the arrows 35 and 36. In this case, when the driver touches the arrows 35 and 36 by a finger, other obstacles that are not displayed on the screen can be displayed.

Second Embodiment

Figure 6:
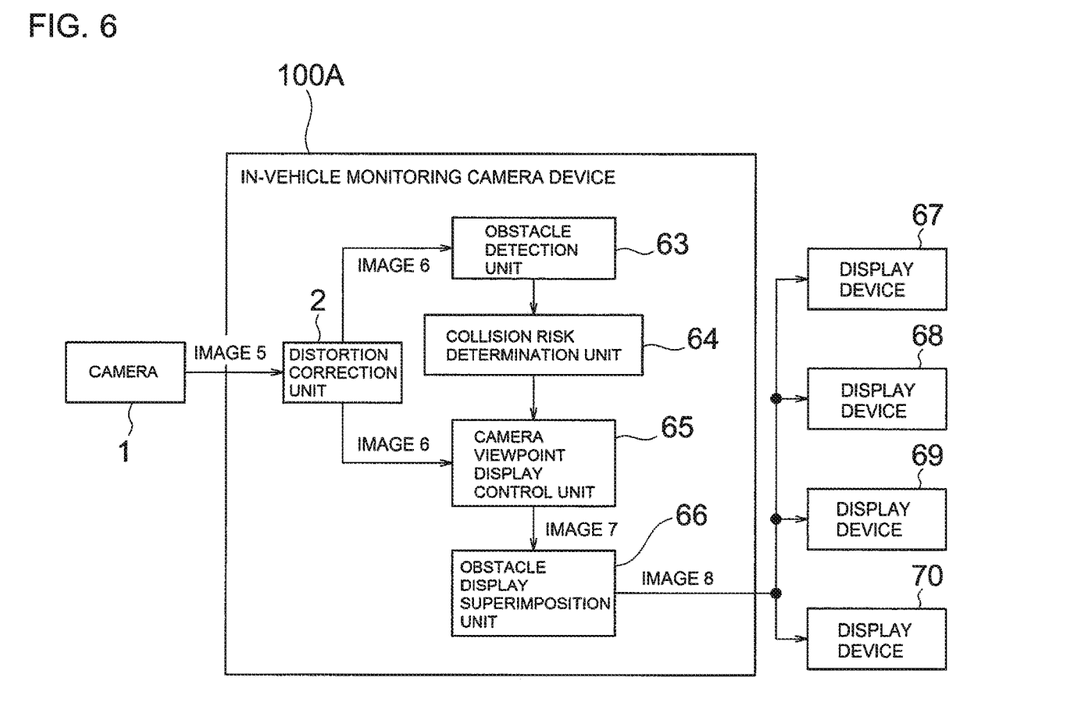
FIG. 6 is a block diagram for illustrating a configuration of an in-vehicle monitoring camera device according to a second embodiment of the present invention.

FIG. 6 is a block diagram for illustrating a configuration of an in-vehicle monitoring camera device 100A according to a second embodiment of the present invention. An in-vehicle monitoring camera device 100A is mounted to an own vehicle 101.

First, as illustrated in FIG. 6, as in the first embodiment, the camera 1 is connected to the in-vehicle monitoring camera device 100A. As illustrated in FIG. 5, as in the first embodiment, the camera 1 is arranged in a rear portion of the own vehicle 101. The camera 1 is equipped with a wide-angle lens. Thus, as in the image pickup range 50 illustrated in FIG. 5, the camera 1 is capable of acquiring an image within an image pickup range having the camera 1 as its center and having a wide view angle of, for example, 180°. The camera 1 picks up an image behind the own vehicle 101 to output an image 5.

As in the first embodiment, the in-vehicle monitoring camera device 100A includes the distortion correction unit 2 as means for acquiring an image to be displayed. The distortion correction unit 2 receives the image 5 from the camera 1, and uses the same method as that described in the first embodiment to remove distortion of the image 5 caused by the wide-angle lens to obtain an image 6.

The in-vehicle monitoring camera device 100A further includes an obstacle detection unit 63 and a collision risk determination unit 64.

The obstacle detection unit 3 described in the above-mentioned first embodiment uses the sensing information from the millimeter-wave radar 11. Meanwhile, the obstacle detection unit 63 in the second embodiment uses the image 6, which is acquired from the camera 1 via the distortion correction unit 2. The obstacle detection unit 63 performs image recognition processing on the image 6 to detect presence of an obstacle, and subjects coordinates of pixels at which the obstacle is detected to inverse projective transformation to detect a position of the obstacle. The obstacle detection unit 63 further detects, based on a change with time of a position of an obstacle contained in an image 6 obtained through past image processing, the position, direction, and speed of the obstacle, and detects, based on the position, direction, and speed of the obstacle and on the position, direction, and speed of the own vehicle 101, an obstacle that is likely to come into contact with the own vehicle 101 as a first obstacle.

The collision risk determination unit 64 uses the same detection method as that used by the collision risk determination unit 4 described above in the first embodiment to detect a "time to contact" and a "distance between the obstacle and the own vehicle".

The in-vehicle monitoring camera device 100A further includes a camera viewpoint display control unit 65 and an obstacle display superimposition unit 66 as means for performing display.

The camera viewpoint display control unit 65 performs the following three operations (1) to (3).

(1) The camera viewpoint display control unit 65 extracts up to four obstacles from among the obstacles detected by the obstacle detection unit 63 in ascending order of the distance to the obstacle.

(2) The camera viewpoint display control unit 65 cuts out, for each of the extracted obstacles, a fixed range from the image 6 such that the obstacle is positioned at a center of the image in its lateral direction to generate an image 7. The image 7 is generated for each of the obstacles, and hence the number of images 7 is up to four. In this case, the fixed range is, for example, a pixel range that is set in advance. Further, the center of the image in its longitudinal direction is fixed irrespective of the position of an obstacle, in order to enable the driver to grasp the distance to the obstacle.

(3) The camera viewpoint display control unit 65 superimposes, onto the image 7, the radar chart 31, which is an image indicating a field-of-view range of the image 7 or a central direction of a field of view of the image 7. The radar chart 31 is the same as the radar chart 31 described above in the first embodiment, and hence a description thereof is omitted here.

The obstacle display superimposition unit 66 superimposes, onto the obstacle of each image 7, the mark 34 whose shape and color are changed depending on the distance between the obstacle and the own vehicle to generate an image 8, and displays the image 8 on a corresponding one of four display devices 67, 68, 69, and 70. The shape and color of the mark are defined in advance in, for example, the data table of FIG. 4B. An example of the image 8 may be the same as, for example, the image 4 (reference numeral 30) illustrated in FIG. 4A.

Figure 7:
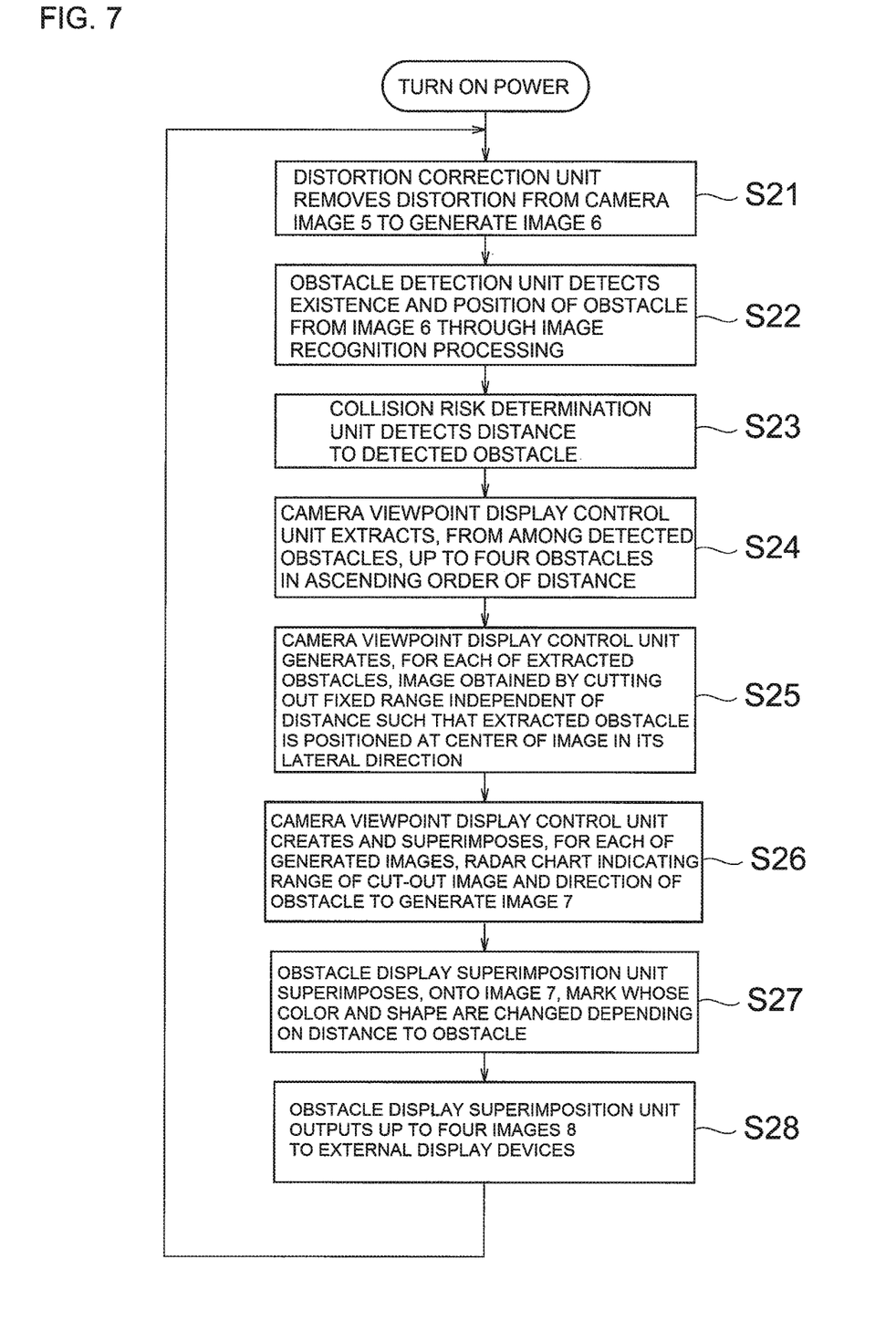
FIG. 7 is a flow chart for illustrating a flow of processing to be performed by the in-vehicle monitoring camera device according to the second embodiment of the present invention.

Next, referring to a flowchart of FIG. 7, a description is given of an operation of the in-vehicle monitoring camera device 100A according to the second embodiment.

First, the distortion correction unit 2 removes, from the image 5 acquired from the camera 1, image distortion caused by the wide-angle lens to generate the image 6 (Step S21).

Next, the obstacle detection unit 63 uses the image 6 to detect existence of a first obstacle and a position of the first obstacle through image recognition processing (Step S22).

Next, based on the detected position of the first obstacle and the position of the own vehicle 101, the collision risk determination unit 64 detects a distance between the first obstacle and the own vehicle 101 (Step S23).

Next, the camera viewpoint display control unit 65 extracts, from among the first obstacles, up to four obstacles in ascending order of a time or distance to contact with the own vehicle 101, as the second obstacles (Step S24). When the number of first obstacles is equal to or less than four, the number of second obstacles to be extracted is the same as the number of first obstacles.

Next, the camera viewpoint display control unit 65 cuts out, for each of the second obstacles, an image having a fixed range from the image 6 as the image 7 such that the second obstacle is positioned at a center of the image in its lateral direction (Step S25). The number of images 7 is the same as the number of second obstacles. As in the first embodiment, the fixed range is, for example, a pixel range that is set in advance.

The camera viewpoint display control unit 65 then superimposes, for each of the images 7, the radar chart 31 indicating a field-of-view range of the cut-out image or a central direction of a field of view of the cut-out image (Step S26).

Finally, the obstacle display superimposition unit 66 superimposes, in accordance with the data table of FIG. 4B, a mark whose shape and color are changed depending on the distance between the own vehicle 101 and the obstacle, onto each of the images 7 to generate the image 8 (Step S27). The number of images 8 is the same as the number of second obstacles.

Next, the obstacle display superimposition unit 66 outputs the image 8 to a corresponding one of the external display devices 67, 68, 69, and 70 (Step S28).

The operation of from Step S21 to Step S28 is periodic loop processing, which is started when the image 5 is input from the camera 1, and after the processing to Step S28 is finished, the processing waits for the image 5 to be input from the camera 1, and then the processing of from Step S21 to Step S28 is started again.

In the second embodiment, through implementation with such a system configuration and operation, when the own vehicle 101 travels back, even without use of a large-sized display device, the driver can quickly grasp existence and a position of each of the plurality of obstacles having a risk of colliding with the own vehicle 101 in a wide range of 180° around the vehicle.

In the second embodiment, the camera output unit 12 and the display device 10 illustrated in FIG. 1 are not provided, but even in the second embodiment, the camera output unit 12 and the display device 10 illustrated in FIG. 1 may be provided to display the image 5.

In the second embodiment, the operation device 8 illustrated in FIG. 1 is not provided, but even in the second embodiment, the operation device 8 illustrated in FIG. 1 may be provided to enable obstacles to be switched in accordance with a switching order specified by the driver.

As described above, according to the second embodiment, the in-vehicle monitoring camera device 100 includes: the obstacle detection unit 63 configured to detect, as a first obstacle, an obstacle that is likely to collide with the own vehicle from among obstacles detected by the camera 1; the collision risk determination unit 64 configured to detect a time until the first obstacle and the own vehicle 101 come into contact with each other or a distance between the first obstacle and the own vehicle; the distortion correction unit 2 configured to receive input of a first image picked up by a wide-angle lens, and correct distortion of the first image to generate a second image; the camera viewpoint display control unit 65 configured to extract, as a second obstacle, a first obstacle having the shortest time or the shortest distance from among the times or the distances detected by the collision risk determination unit 64, and cut out an image having a fixed range from the second image such that the second obstacle is located at a center in a lateral direction of the image to generate a third image; and the first display devices 67 to 70 each configured to display the third image. Further, the camera viewpoint display control unit 5 is configured to superimpose the radar chart 31, which is an image indicating a field-of-view range of the third image or a central direction of a field of view of the third image with respect to an image pickup range of the first image, onto the third image, to thereby indicate a direction of the second obstacle. With this configuration, the same effects as those of the first embodiment can be obtained.

In the second embodiment, the camera viewpoint display control unit 5 is configured to extract a plurality of first obstacles as second obstacles, and generate the third image for each of the plurality of first obstacles. Further, the plurality of display devices 67 to 70 are provided as display devices, and the third image generated for each of the first obstacles is displayed on a corresponding one of screens of the display devices 67 to 70. With this configuration, it is possible to display a plurality of obstacles on the display devices without requiring the driver to switch between screens.

REFERENCE SIGNS LIST 1 camera, 2 distortion correction unit, 3, 63 obstacle detection unit, 4, 64 collision risk determination unit, 5, 65 camera viewpoint display control unit, 6 viewpoint storage unit, 7, 66 obstacle display superimposition unit, 8 operation device, 9, 10, 67, 68, 69, 70 display device, 11 millimeter-wave radar, 12 camera output unit, 100, 100A in-vehicle monitoring camera device, 101 own vehicle, 102 obstacle

The invention claimed is:

1. An in-vehicle monitoring camera device, comprising:
an obstacle detection unit configured to detect, as a first obstacle, an obstacle that is likely to collide with an own vehicle from among obstacles detected by a radar or a camera;
a collision risk determination unit configured to detect a time until the first obstacle and the own vehicle come into contact with each other or a distance between the first obstacle and the own vehicle;
a distortion correction unit configured to receive input of a first image picked up by a wide-angle lens, which has an image pickup range wider than an image pickup range of a standard lens, and correct distortion of the first image to generate a second image;

a camera viewpoint display control unit configured to detect, as a second obstacle, a first obstacle having the shortest time or the shortest distance from among the times or the distances detected by the collision risk determination unit, and cut out an image having a fixed range from the second image such that the second obstacle is located at a center in a lateral direction of the image to generate a third image; and a first display device configured to display the third image, wherein the camera viewpoint display control unit is configured to superimpose, onto the third image, an image indicating a field-of-view range of the third image or a central direction of a field of view of the third image.

2. The in-vehicle monitoring camera device according to claim 1, further comprising an obstacle display superimposition unit configured to superimpose highlight display for highlighting the second obstacle displayed in the third image, onto the second obstacle in the third image.

3. The in-vehicle monitoring camera device according to claim 2, wherein the obstacle display superimposition unit is configured to change a color of the highlight display depending on the time or the distance detected by the collision risk determination unit.

4. The in-vehicle monitoring camera device according to claim 2, wherein the obstacle display superimposition unit is configured to change a shape of the highlight display depending on the time or the distance detected by the collision risk determination unit.

5. The in-vehicle monitoring camera device according to claim 2, wherein the obstacle display superimposition unit is configured to superimpose, onto the third image, information indicating existence of another first obstacle that is located outside the third image.

6. The in-vehicle monitoring camera device according to claim 1, further comprising an operation device configured to receive input of a switching instruction to switch the second obstacle to be displayed in the third image to another second obstacle from among the first obstacles.

7. The in-vehicle monitoring camera device according to claim 6, wherein an order of switching in response to the switching instruction input to the operation device is based on the time or the distance detected by the collision risk determination unit.

8. The in-vehicle monitoring camera device according to claim 6, wherein an order of switching in response to the switching instruction input to the operation device is based on a direction in which the first obstacle exists.

9. The in-vehicle monitoring camera device according to claim 1, further comprising a second display device configured to display the first image.

10. The in-vehicle monitoring camera device according to claim 1, wherein the camera viewpoint display control unit is configured to extract a plurality of first obstacles as the second obstacles, and generate the third image for each of the plurality of first obstacles, and wherein the first display device includes a plurality of screens, and is configured to display the third image generated for each of the plurality of first obstacles on a corresponding one of the plurality of screens.

* * * * *